United States Patent
Paola et al.

(10) Patent No.: US 11,543,945 B1
(45) Date of Patent: Jan. 3, 2023

(54) ACCURATE LOCAL DEPICTION OF PREVIEW OF A PROGRAM WINDOW INCLUDED IN A REMOTE GRAPHICAL DESKTOP

(71) Applicant: Amazon Technologies, Inc., Seattle, WA (US)

(72) Inventors: Christopher Mark Paola, Seattle, WA (US); Marco Mastropaolo, Turin (IT); Davide Benotto, Moncallieri (IT); Mehrdad Montazeri, Asti (IT); Silvio Lazzeretti, Val Della Torre (IT); Vinothkumar Narasimhan, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 2 days.

(21) Appl. No.: 16/835,118

(22) Filed: Mar. 30, 2020

(51) Int. Cl.
| | |
|---|---|
| *G06F 3/0484* | (2022.01) |
| *G06F 9/451* | (2018.01) |
| *G06F 3/14* | (2006.01) |
| *H04L 67/568* | (2022.01) |

(52) U.S. Cl.
CPC .......... *G06F 3/0484* (2013.01); *G06F 3/1462* (2013.01); *G06F 9/452* (2018.02); *H04L 67/568* (2022.05)

(58) Field of Classification Search
CPC ...... G06F 3/0484; G06F 3/1462; G06F 9/452; H04L 67/2842
See application file for complete search history.

(56) References Cited

U.S. PATENT DOCUMENTS

| | | | |
|---|---|---|---|
| 7,681,143 B2* | 3/2010 | Lindsay | G06F 3/0481 |
| | | | 715/788 |
| 9,021,526 B1* | 4/2015 | Baron | H04N 21/2662 |
| | | | 725/38 |
| 9,602,849 B2* | 3/2017 | Lin | H04N 21/47202 |
| 9,690,764 B1* | 6/2017 | Batni | G06F 40/103 |
| 9,904,969 B1* | 2/2018 | Westerhoff | H04L 12/413 |
| 2004/0066414 A1* | 4/2004 | Czerwinski | G06F 3/0481 |
| | | | 715/781 |
| 2006/0010392 A1* | 1/2006 | Noel | H04N 7/15 |
| | | | 715/759 |
| 2006/0268100 A1* | 11/2006 | Karukka | G06F 3/0482 |
| | | | 348/14.01 |
| 2009/0094523 A1* | 4/2009 | Treder | G06F 9/542 |
| | | | 715/738 |

(Continued)

FOREIGN PATENT DOCUMENTS

CN        103491425 B    *   8/2017

Primary Examiner — Ariel Mercado
Assistant Examiner — Phoebe X Pan
(74) Attorney, Agent, or Firm — Lee & Hayes, P.C.

(57) ABSTRACT

A technology is described for generating window images of a program window in a service provider environment and providing the window images to a client device for display on the client device when a preview event is detected on the client device. An example method may include detecting a modification to a program window associated with a program hosted on a computing resource located in a service provider environment, obtaining a window image of the program window capturing a graphical state of the program window, and sending the window image to the client device to allow the client device to display the window image on the client device in response to a preview event on the client device that is associated with the program window.

20 Claims, 10 Drawing Sheets

(56) References Cited

U.S. PATENT DOCUMENTS

| | | | |
|---|---|---|---|
| 2009/0193364 A1* | 7/2009 | Jarrett | G06F 3/04817 715/838 |
| 2009/0307428 A1* | 12/2009 | Schmieder | G06F 3/1462 711/118 |
| 2010/0303146 A1* | 12/2010 | Kamay | H04N 21/2343 375/240.02 |
| 2010/0306413 A1* | 12/2010 | Kamay | H04N 19/30 709/247 |
| 2011/0113346 A1* | 5/2011 | O'Shaugnessy | G06F 40/14 715/752 |
| 2011/0125755 A1* | 5/2011 | Kaila | G06F 16/54 707/740 |
| 2011/0138314 A1* | 6/2011 | Mir | G06F 9/452 715/779 |
| 2011/0138416 A1* | 6/2011 | Kang | H04N 21/42208 725/39 |
| 2012/0084713 A1* | 4/2012 | Desai | G06F 3/0481 715/788 |
| 2013/0173819 A1* | 7/2013 | Lee | H04N 21/2662 709/231 |
| 2014/0118239 A1* | 5/2014 | Phillips | G06F 3/1454 345/156 |
| 2014/0136973 A1* | 5/2014 | Kumar | G06F 16/9574 715/274 |
| 2014/0289423 A1* | 9/2014 | Kim | H04N 21/44227 709/233 |
| 2015/0040161 A1* | 2/2015 | Haykinson | H04N 21/8549 725/41 |
| 2015/0278234 A1* | 10/2015 | Masterson | G06F 16/9577 715/234 |
| 2015/0317067 A1* | 11/2015 | Matiossian | G06F 3/04842 715/716 |
| 2016/0077685 A1* | 3/2016 | Fang | G06F 9/452 715/778 |
| 2017/0199749 A1* | 7/2017 | Wolfson | G06F 3/0481 |
| 2019/0294652 A1* | 9/2019 | Kang | G06F 16/583 |
| 2020/0133694 A1* | 4/2020 | Bosnjakovic | H04L 65/607 |
| 2020/0410026 A1* | 12/2020 | Reuter | G06F 16/9536 |

* cited by examiner

ACCURATE LOCAL DEPICTION OF PREVIEW OF A PROGRAM WINDOW INCLUDED IN A REMOTE GRAPHICAL DESKTOP

BACKGROUND

The advent of virtualization technologies for computing resources has provided benefits with respect to managing large-scale computing resources for many customers of a computing service provider with diverse needs and has allowed various computing resources or computing services to be efficiently and securely shared by multiple customers of the computing service provider. For example, virtualization technologies may allow a single physical computing machine to be shared among multiple customers by providing each customer with one or more computing instances hosted by the single physical computing machine using a hypervisor. Each computing instance may be a guest virtual machine acting as a distinct logical computing system that provides a customer with the perception that the customer is the sole operator and administrator of a virtualized hardware computing resource.

Application software may be loaded on a computing instance and a customer of a computing service provider may be provided with access to the application software. For example, a desktop application that performs defined tasks (e.g., a word processing application, a spreadsheet application, a graphics application, etc.) may be installed on a computing instance located in a service provider environment (e.g., a "cloud" computing environment) and a customer may access the desktop application hosted on the computing instance using a client device (e.g., a laptop or a desktop computer), allowing the customer to remotely access and utilize the desktop application from any client device capable of connecting to the service provider environment.

DETAILED DESCRIPTION

Figure 1:
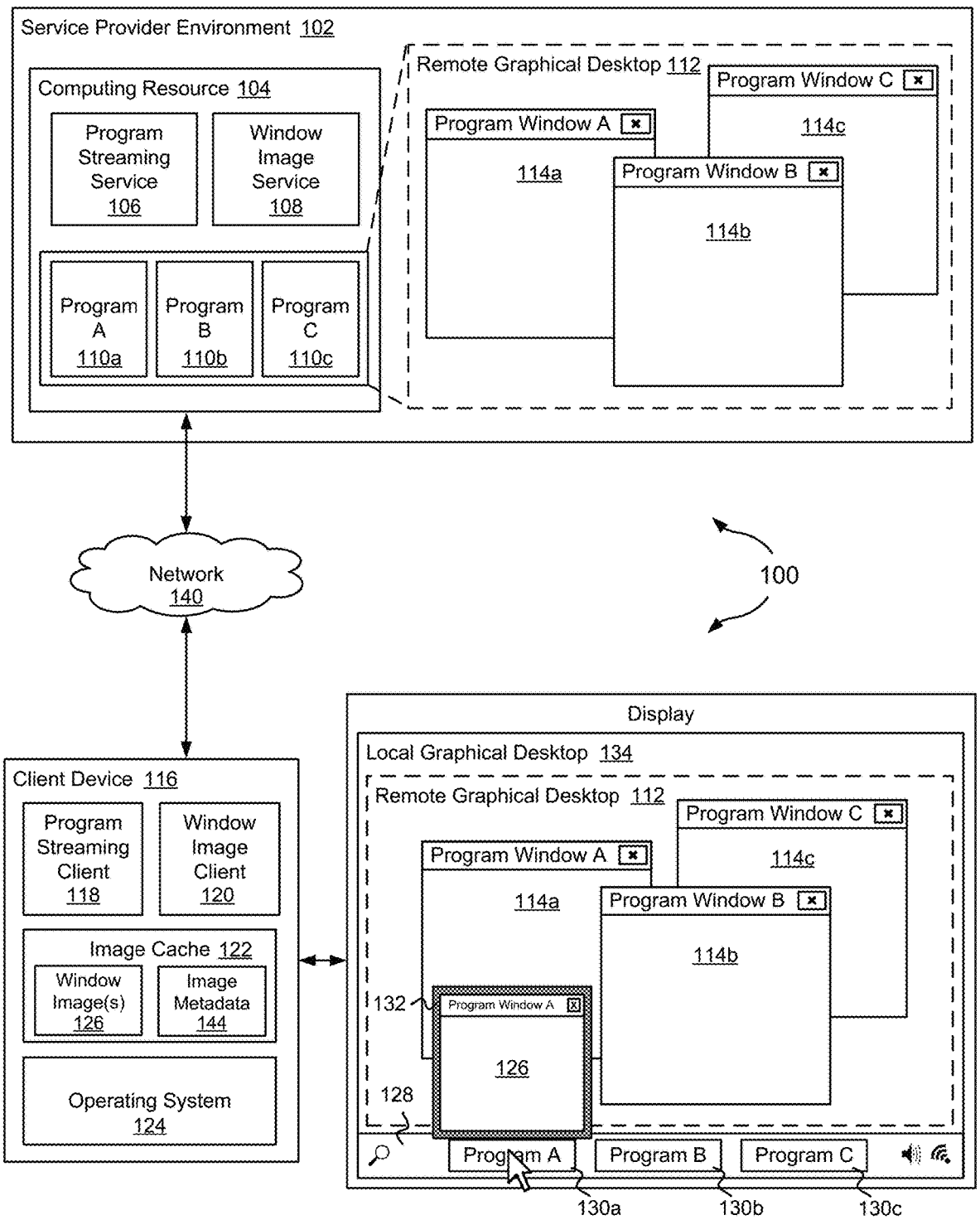
FIG. 1 is a block diagram illustrating an example system for generating a window image of a program window located in a service provider environment and providing the window image to a client device.

A technology is described for generating a window image of a program window associated with a program that executes on a computing instance or software container in a service provider environment and providing the window image to a client device, allowing for an accurate local depiction of the program window on the client device using the window image of the program window. In one example, a window image service located on a computing resource (e.g., a computing instance or software container) in the service provider environment may generate the window image of the program window and send the window image to a window image client located on the client device. The window image may show a graphical state of the program window, which may include a state of the program window and a state of content displayed within the program window. The window image client located on the client device may store the window image in a cache of window images, and the window image may be retrieved from the cache and displayed in a graphical desktop environment on the client device in response to a preview event. Illustratively, the preview event may be a taskbar button hover event associated with positioning a graphical cursor or pointer over a taskbar button causing the window image of the program window to be displayed in a thumbnail preview above a taskbar button associated with the program window, or the preview event may be a thumbnail preview hover event that causes the window image of the program window to be displayed in the forefront of the graphical desktop (e.g., the window image may be displayed as a preview window on the graphical desktop covering a significant portion of the desktop screen area and other windows on the graphical desktop may be hidden).

In another similar example, the window image client on the client device may detect a preview event that causes a window image of a program window streamed to the client device to be displayed on the client device. As described above, the preview event may include: a hover event that causes a window image to be displayed in a thumbnail preview above a taskbar button, a thumbnail preview hover event that causes a window image to be displayed in the forefront of a graphical desktop on the client device, or another type of preview event that displays a preview of a program window on the client device. In response to detecting the preview event, the window image client may obtain a window image from a cache of window images located on the client device and provide the window image to an operating system to allow the window image to be displayed on the client device according to the preview event detected. As part of providing the window image to a local operating system on the client device, the window image client may send an update request for an updated window image for the program window to the window image service located on the computing resource in the service provider environment where the program window is located. In response to the update request, the window image service may obtain the updated window image and send the updated window image to the window image client on the client device. The window image client may replace the window image stored in the cache with the updated window image of the program window, thereby providing the updated window image to the operating system on the client device and allowing the operating system to display the updated window image on the client device.

The current technology generates and transmits an individual window image for each program window streamed to a client device to allow individual window images for individual program windows to be displayed on the client device. Prior to the current technology, a remote desktop process on a client device was not provided with sufficient user interface data to allow the display of an unobstructed preview of a window image for each program window streamed to the client device. For example, a stream of a remote graphical desktop containing multiple program windows may not include data that can be used to provide a preview of each program window included in the stream of the remote graphical desktop. For instance, the stream of the remote graphical desktop does not include a window state and a current graphical rendering (e.g., a graphical screen shot) for each window in the remote graphical desktop. Rather, the stream of the remote graphical desktop contains undifferentiated bitmap data for displaying what is currently viewable on the remote graphical desktop on a display or screen, as such a first program window in the remote graphical desktop stream may overlap or completely obscure a second program window in the remote graphical desktop stream. Therefore, if the client device were to attempt to display a preview window for the second program window, part of the content of the second program window would be missing because the window cannot be seen and the data to visibly render the second program window is not stored by the remote desktop client. The current technology overcomes this issue by generating a window image for each program window included in stream of a remote graphical desktop and sending the window images to a client device. Accordingly, the client device may be provided the data needed to allow the client device to display a preview window for each program window streamed to the client device.

To further describe the present technology, examples are now provided with reference to the figures. FIG. 1 is a diagram illustrating a high level example of a system 100 that may be used to generate a window image 126 of a program window 114a-c for a program 110a-c that executes in a service provider environment 102, and the system 100 may provide the window image 126 to a window image client 120 on a client device 116 so that the window image 126 of the program window 114a-c can be displayed on the client device 116 when a preview event is detected on the client device 116.

As illustrated, the system 100 may include a computing resource 104 hosted in a service provider environment 102 in network communication with a client device 116. The computing resource 104 may be a server computer, a computing instance, a software container, or another type of computing resource on which a program 110a-c may be installed and executed. In one example, programs 110a-c may be installed on a common computing resource 104, such as a computing instance, and a program streaming service 106 may stream a remote graphical desktop 112 containing program windows 114a-c for the programs 110a-c to a client device 116. In another example, the programs 110a-c may be installed on separate computing resources 104, such as in separate software containers, and a program streaming service 106 may aggregate output of the programs 110a-c into a stream of a remote graphical desktop 112 which may be streamed to a client device 116.

The programs 110a-c may have access to other resources in a service provider environment such as data stores (e.g., relational, NoSQL, or other data stores), file shares, license servers, application services, directory services, hosted applications and other computing services in the service provider environment. Programs or processes executing on other computing resources or computing instances may also have output aggregated and displayed through the remote graphical desktop 112. A computing instance may be a virtual machine (e.g., an instance of a software implementation of a computer) that executes applications like a physical machine or server. A software container may be a virtual container in which an application and application dependencies may be contained, providing an isolated environment for the execution of the application on a computing instance. A service provider environment 102 or "cloud" computing environment may provide customers of a service provider with on-demand computing system resources located in one or more data centers. An example of a service provider environment is described in more detail later in association with FIG. 9.

The client device 116 may comprise a processor-based system such as a computing device. The client device 116 may be a device such as, but not limited to, a desktop computer, laptop or notebook computer, tablet computer, workstation, network computer, or another computing device with like capability.

Remote Graphical Desktop Streaming

The computing resource 104 hosted in the service provider environment 102 may be used to provide a customer with remote access to one or more programs 110a-c which the customer may utilize via the client device 116. As an example, a program 110a-c may be installed on the computing resource 104, and the program 110a-c may be a desktop application which may include software designed for end users, such as a word processor, a spreadsheet, an accounting application, a web browser, an email client, a media player, a file viewer, a console game, a photo editor, and the like. As part of launching the program 110a-c on the computing resource 104, a program window 114a-c for the program 110a-c may be created on the computing resource 104. The program window 114a-c may be a graphical control element used to display a graphical user interface of the program 110a-c in a desktop environment, allowing a customer to interact with the program 110a-c via the graphical user interface displayed in the program window 114a-c. A desktop environment may be a graphical user interface provided by an operating system that allows interaction with programs and applications. Electronic objects included in a desktop environment may include program windows, icons, files, folders, and/or mouse pointers.

A program streaming service 106 may stream a remote graphical desktop 112 executed on a computing resource 104 in a service provider environment 102 over a network 140 to program streaming client 118 on the client device 116. A customer via the client device 116 may interact with objects included in the remote graphical desktop 112. The remote graphical desktop 112 may include a program window 114a-c for a program 110a-c and a customer may interact with the program 110a-c executed on the computing resource 104 via the program window 114a-c streamed to the client 116. The program streaming service 106, in one example, may be a managed service provided by a computing service provider.

In one example, a virtual desktop infrastructure (VDI) may be used to allow customers to access a remote graphical desktop 112 and remote programs 110a-c using a client device 116. The VDI implementation may operate in a server driven computing environment that includes the computing resource 104 hosted in the service provider environment 102 and the client device 116. The VDI implementation may include executing a program 110*a-c* on the computing resource 104 and using a remote display protocol to communicate with the program streaming client 118 on the client device 116 over a computer network 140 allowing a customer to interact with the program 110*a-c*.

As a specific example, the program streaming service 106 may use a remote display protocol to encode a remote graphical desktop 112 as a data stream (e.g., a stream of pixel data) and stream the remote graphical desktop 112 to the client device 116. The data stream may be a sequence of digitally encoded signals (e.g., packets of data or data packets) which can be transmitted over a computer network to the client device 116. A program streaming client 118 located on the client device 116 may receive the data stream and request that an operating system 124 on the client device 116 display the remote graphical desktop 112 on a local graphical desktop 134 of the client device 116 (i.e., a display device connected to the client device 116, such as a display screen or computer monitor). The program streaming client 118 may request that a window and associated taskbar button may be created on the local graphical desktop 134 of the client device 116 for each program window included in the remote graphical desktop 112. Input and Output (I/O) data, such as display I/O, keyboard I/O, and input device I/O may be communicated between the program streaming service 106 and the program streaming client 118 to allow a customer to interact with a program 110*a-c*.

In one example, the program streaming client 118 in the client device 116 may create a taskbar button 130*a-c* for a program window 114*a-c* included in a remote graphical desktop 112 in a taskbar 128 on the client device 116. The taskbar 128 may be a graphical bar at an edge of the display of the client device 116 that contains taskbar buttons 130*a-c* for programs with windows that may be accessible via the client device 116. A program may be brought to the foreground of a desktop environment 112/134 by selecting a taskbar button 130*a-c* associated with the program. As a specific example, the program streaming client 118 on the client device 116 may request that the operating system 124 create a taskbar button 130*a-c* for each individual program window 114*a-c* in a remote graphical desktop 112 created by the program streaming client 118. A customer may select a taskbar button 130*a-c* associated with a program window 114*a-c* included in the remote graphical desktop 112 and the program window 114*a-c* may be brought to the foreground of the remote graphical desktop 112 to allow the customer to interact with a remote program 110*a-c* via a graphical user interface contained in the program window 114*a-c*. Also, as explained in more detail later, a customer may trigger a hover event that causes a preview of a program window 114*a-c* to be displayed on the client device 116 by interacting with a taskbar button 130*a-c* (e.g., by hovering a cursor or pointer over the taskbar button 130*a-c*).

As part of streaming the remote graphical desktop 112 to the client device 116, a window image 126 of a program window 114*a-c* may be generated in response to window lifecycle events as described later. The window image 126 may be sent to the client device 116 to allow the window image 126 to be displayed on the client device 116 when a preview event (e.g., taskbar hover event) is detected. As explained earlier, prior to the current technology, a client device was not provided with sufficient graphical data to allow the client device to display a window image for individual program windows included in a remote graphical desktop streamed to the client device. The present technology overcomes the problems of the prior technologies by sending individual window images 126 of program windows 114*a-c* to the client device 116, allowing a window image client 120 to provide a window image 126 of a particular program window 114*a-c* from a cache.

Window Image Service

In one example, the computing resource 104 in the service provider environment 102 may host a window image service 108 which may be in network communication with a window image client 120 located on the client device 116. In one example, the window image service 108 may execute as a background process on the computing resource and monitor a remote graphical desktop 112 to detect program window 114*a-c* events associated with one or more program windows 114*a-c* included in the remote graphical desktop 112. Program window events that may be detected by the window image service 108 include, but are not limited to: window lifecycle events associated with creating and terminating a program window 114*a-c* in the remote graphical desktop 112; window state events that resize a program window 114*a-c* (e.g., modify the dimensions of the program window 114*a-c*); window content events that modify the content in a program window 114*a-c* (e.g., inputs, deletions, or modifications to the content displayed in the program window 114*a-c*); window playback events that cause video playback in a program window 114*a-c*; window active events that sets the current window to a program window 114*a-c*, bringing the program window 114*a-c* to the foreground of a remote graphical desktop 112; as well as other types of window events not specifically described herein.

The window image service 108 may detect a program window event associated with a program window 114*a-c* and obtain a window image 126 of the program window 114*a-c* that shows a current graphical state, or a recent graphical state, of the program window 114*a-c*. The window image 125 may be a two-dimensional (2D) array of images that capture a graphical state of the program window 114*a-c* at the point the program window event occurs. A graphical state of a program window 114*a-c* may be, for example, a graphical rendering of a graphical window and related control elements comprising a visual area containing graphical content (e.g., a user interface and/or media) framed by a window decoration (e.g., a title bar and a border). In one example, the window image service 108 may detect a launch of a program window 114*a-c* in a remote graphical desktop 112 and obtain a window image 126 of the program window 114*a-c*. In another example, as part of obtaining the window image 126 of the program window 114*a-c*, the window image service 108 may request that an operating system (not shown) on the computing resource 104 generate the window image 126 of the program window 114*a-c* (e.g., a screenshot of the program window 114*a-c*). The window image 126 may capture a graphical state (e.g., viewable state) of the program window 114*a-c* at the time that the program window 114*a-c* was launched on the remote graphical desktop 112. The window image service 108 may send the window image 126 to the window image client 120 on the client device 116 to allow the window image 126 to be displayed as a preview window (e.g., a taskbar preview window 132).

After detecting the launch of the program window 114*a-c* in the remote graphical desktop 112, the window image service 108 may monitor the program window 114*a-c* to detect program window events that modify the program window 114*a-c*, such as the dimensions of the program window 114*a-c* and/or the content of the program window 114*a-c*. In response to detecting a program window event that modifies the program window 114*a-c*, the window image service 108 may obtain or capture an updated window image 126 of the program window 114*a-c* showing the modification(s) to the program window 114*a-c* and send the updated window image 126 to the window image client 120 in the client device 116. Accordingly, a series of window images 126 may be generated to capture modifications made to the program window 114*a-c*, and the series of window images 126 of window images 126 may be sent to the client device 116 to allow a preview of the program window 114*a-c* to be displayed on the client device 116 and to update the preview to show a current or recent state of the program window 114*a-c*. In this configuration, the program window 114*a-c* that will be stored is a most recent copy of the program window.

In one example, prior to obtaining a window image 126 of a program window 114*a-c*, the window image service 108 may determine whether a modification to the program window 114*a-c* meets a modification threshold that allows the window image service 108 to obtain a window image 126 that includes the modification to the program window 114*a-c*. Examples of modification thresholds may include, but are not limited to, a percentage change to the dimensions of a program window 114*a-c*, a percentage change to the content of a program window 114*a-c*, a time interval between modifications, as well as other types of modification thresholds. The window image service 108 may track when modifications occur to a program window 114*a-c* and when the window image service 108 detects that a modification, or a series of modifications, meets a modification threshold, the window image service 108 may obtain a window image 126 of the program window 114*a-c* and the window image service 108 may send the window image 126 to the client device 116. As a specific example, the window image service 108 may monitor a program window 114*a-c* and track a number of modifications (e.g., word processing modifications, spreadsheet modifications, image modifications, etc.) made to the content of the program window 114*a-c*, and in the case that the number or amount of modifications meets a modification threshold, the window image service 108 may obtain a window image 126 of the program window 114*a-c* and send the window image 126 to the client device 116.

In another example, the window image service 108 may periodically obtain a window image 126 of a program window 114*a-c* (e.g., at 1, 10, or 30 second intervals) and send the window image 126 to the client device 116. A time threshold (e.g., 1, 10, or 30 second intervals) may be used to limit the number of window images 126 that are sent to the client device 116 during a time period, thereby preserving network bandwidth for streaming the remote graphical desktop 112 to the client device 116 and for other network activities. Periodically sending window images 126 to the client device 116 may avoid sending a series of window images 126 to the client device 116 in a short amount of time, such as when a rapid succession of modifications are made to a program window 114*a-c* (e.g., rapid keyboard input to a word processing document) causing the series of window images 126 to be sent to the client device 116 in a defined time period or a short time period, potentially consuming network resources used to stream the remote graphical desktop 112 and causing a degradation in streaming performance. In one example, the window image service 108 may detect video playback in a program window 114*a-c* and generate at window images 126 that capture the video playback in the program window 114*a-c* at a defined time interval (e.g., every three (3) seconds or every ten (10) seconds).

In another example, the window image service 108 may use both a modification threshold and a time threshold to determine when to obtain a window image 126 of a program window 114*a-c* and send the window image 126 to the client device 116. The modification threshold may be used to ensure that a window image 126 contains a minimum number or amount of modifications (e.g., 2, 3, 5, or more modification events, a specific minimum percentage of pixels, etc.), and the time threshold may be used to limit the number of window images 126 that are sent to the client device 116 during a defined time period. Use of the modification threshold may ensure that a window image 126 is sufficiently modified to warrant updating a preview window (e.g., a taskbar preview window 132) with the window image 126, and use of the time threshold may prevent sending a series of window images 126 to the client device 116 in a short amount of time. As an illustration, if prior to the expiration of the time period, a number of modifications made to a program window 114*a-c* meets the modification threshold, the window image service 108 may wait until the time period expires to obtain and send a window image 126 to the client device 116. If the time period expires and the number of modifications made to the program window 114*a-c* does not meet the modification threshold, the window image service 108, in one example, may wait until the modification threshold is met to send a window image 126 of the program window 114*a-c* to the client device 116. In another example, if the time period has expired, the window image service 108 may determine whether at least one modification has been made to the program window 114*a-c* and send a window image 126 to the client device 116.

In addition to obtaining a window image 126 of a program window 114*a-c*, the window image service 108 may generate image metadata 144 for the window image 126. The image metadata 144 may include, for example, a program identifier (e.g., window name) and window attributes (e.g., window state—maximized or normal). The window image service 108 may include image metadata 144 with a window image 126 when sending the window image 126 to the client device 116, allowing the window image client 120 on the client device 116 to associate the window image 126 with a program window 114*a-c* that has a program identifier included in the image metadata 144, and to allow the window image 126 to be displayed on the client device 116 when a window image event associated with the program window 114*a-c* is detected. Also, a window attribute (e.g., window state) included in the image metadata 144 may allow the window image client 120 on the client device 116 to determine how (e.g., normal or maximized) to display the window image 126 on the client device 116 when a window image event associated with the program window 114*a-c* is detected.

The window image service 108, in one example, may receive asynchronous requests for updated versions of window images 126 of program windows 114*a-c* from the window image client 120 located on the client device 116. For example, the window image client 120 may request an updated version of a window image 126 of a program window 114*a-c* when a preview event associated with the program window 114*a-c* is detected on the client device 116, and the window image client 120 may replace an older version of the window image 126 with the updated version of the window image 126 to provide a more recent state of the program window 114*a-c* in a preview of the program window 114a-c displayed on the client device 116. The request for the updated window image 126 may include a program identifier assigned to the program window 114a-c, and the window image service 108 may use the program identifier to identify the program window 114a-c and obtain an updated window image 126 of the program window 114a-c. The window image service 108 may then send the updated version of the window image 126 to the window image client 120 located on the client device 116.

In one request example, prior to sending an updated version of a window image 126, the window image service 108 may first determine whether a program window 114a-c associated with the request has been modified, or has been modified sufficiently to warrant sending an updated window image 126. In the case that the program window 114a-c has been modified (or modified sufficiently), the window image service 108 may send the updated version of the window image 126 to the window image client 120. If the program window 114a-c has not been modified or has not been modified enough for an update, then the window image service 108 may send a "no update" message to the window image client 120.

In one example, prior to sending a window image 126 of a program window 114a-c to the client device 116, the window image service 108 may apply a data compression technique to the window image 126. The window image 126 may be compressed using any lossless or lossy data compression technique, including JPEG, BMP, TGA, TIFF or another appropriate data compression technique. Compressing window images 126 may reduce an amount of network resources used to send the window images 126 to the client device 116, making more network resources available to stream the remote graphical desktop 112 to the client device 116.

In another example, prior to sending a window image 126 and image metadata 144 to the window image client 120 on the client device 116, the window image service 108 may determine whether sending the window image 126 and image metadata 144 to the client device 116 may interfere or degrade streaming of the remote graphical desktop 112 to the client device 116. In one example configuration, the window image service 108 may evaluate a state of the computer network 140 to determine whether sufficient bandwidth may be available to send both a remote graphical desktop stream and a window image 126 to the client device 116. In the case that a sufficient amount of network bandwidth is available, the window image service 108 may send the window image 126 and image metadata 144 to the client device 116. However, in the case that network bandwidth may not be available to send both the remote graphical desktop stream and the window image 126 to the client device 116, the window image service 108 may prioritize the remote graphical desktop stream over the window image 126 to avoid disruption to the stream of the remote graphical desktop 112, and the window image service 108 may wait to send the window image 126 to the client device 116 until network conditions improve, or terminate sending of the window image 126 to the client device 116 entirely. In another example configuration, the window image service 108 may evaluate a state of the computer network 140 to determine whether network bandwidth capacity is available for sending both a remote graphical desktop stream and uncompressed window images 126 to the client device 116. In the case that available network bandwidth capacity may not be sufficient to send both the graphical desktop stream and the uncompressed window images 126 to the client device 116, the window image service 108 may apply a data compression technique to the window images 126 prior to sending the window images 126 to reduce an amount of network bandwidth capacity used to send the compressed window images 126 to the client device 116.

As mentioned earlier, the window image service 108 may monitor the lifecycle of a program window 114a-c in the remote graphical desktop 112 and detect that the program window 114a-c has been terminated. In response to detecting that a program window 114a-c has been terminated, the window image service 108 may send a message to the window image client 120 located on the client device 116 indicating that the program window 114a-c has been terminated, allowing the window image client 120 to delete a window image 126 of the program window 114a-c from the client device 116.

Window Image Client

Figure 2:
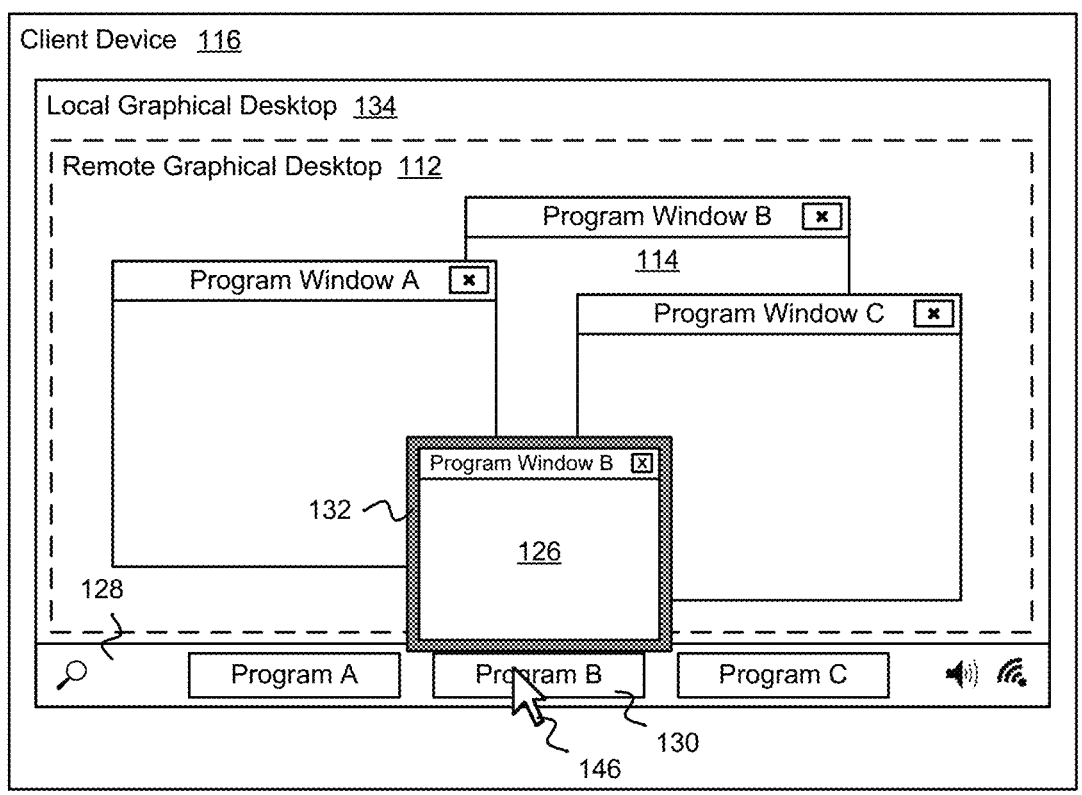
FIG. 2 is a diagram that illustrates displaying a preview of a window image on a client device in response to a taskbar button hover event.
Figure 3A:
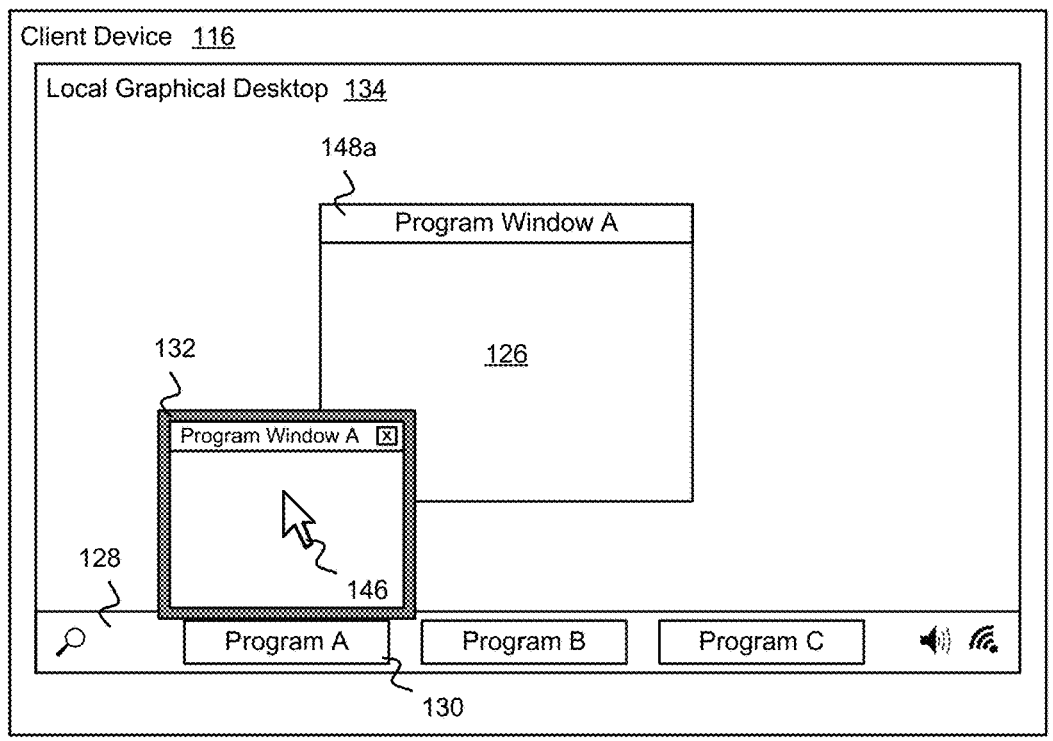
FIGS. 3A-B are diagrams illustrating examples of displaying a preview of a window image on a client device in response to a thumbnail preview hover event detected on the client device.
Figure 3B:
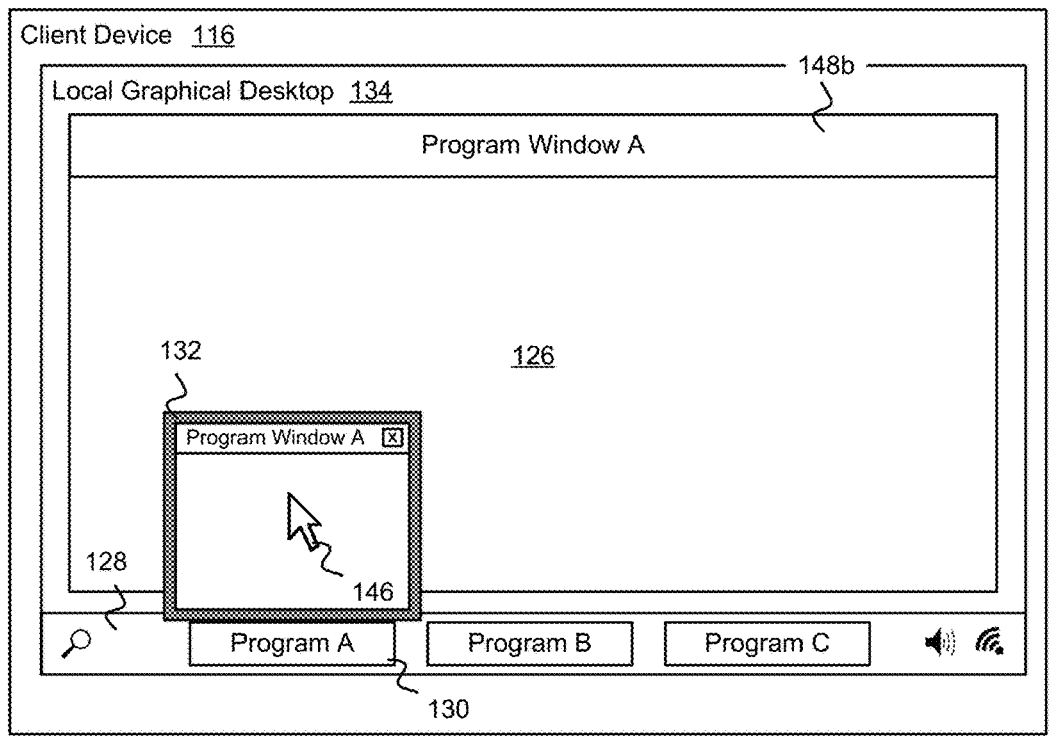

The window image client 120 located on the client device 116 may be in network communication with the window image service 108 located on the computing resource 104 hosted in the service provider environment 102. The window image client 120 may be configured to detect a preview event on the client device 116 associated with a program window 114a-c included in a remote graphical desktop 112 and provide a window image 126 of the program window 114a-c to a graphical user interface of an operating system 124 on the client device 124 to allow the window image 126 to be displayed in a preview window (e.g., taskbar preview window 132) on the client device 116. As described in more detail later in association with FIGS. 2 and 3A-B, a preview event may include a hover event (e.g., mouseover event) that causes an operating system 124 on the client device 116 to display a window image 126 in a preview window (e.g., taskbar preview window 132) to provide a customer with a preview of a program window 114a-c included in the remote graphical desktop 112, such that the window image 126 may be displayed in the foreground on the client device 116 to permit the customer to view a recent state of the program window 114a-c represented in the window image 126. For example, the window image 126 may be displayed in a preview window over a taskbar button 130a-c (as shown in FIGS. 1 and 2), or displayed in a preview window in the foreground of a desktop environment (as shown in FIGS. 3A-B).

As described earlier, the window image client 120 may receive window images 126 and related image metadata 144 from the window image service 108 located in the service provider environment 102. In one example, in response to receiving a window image 126 and image metadata 144, the window image client 120 may store the window image 126 and image metadata 144 in an image cache 122 located in computer memory (e.g., random access memory (RAM)) on the client device 116 to make the window image 126 available for display on the client device 116 when a preview event is detected. For example, in response to detecting a preview event associated with a program window 114a-c, the window image client 120 may identify a window image 126 of the program window 114a-c stored in the image cache 122 and provide the window image 126 to graphical user interface of the operating system 124 to allow the window image 126 to be displayed in a preview window (e.g., taskbar preview window 132). The window image client 120 may use a program identifier assigned to the program window 114a-c to identify the window image 126 in the image cache 122 via image metadata 144 that corresponds to the program identifier. The program identifier may be specified in the preview event and the window image client 120 may obtain the program identifier when the preview event is detected. For example, a hover event associated with a taskbar button 130a-c mapped to the program window 114a-c may generate the preview event, and the program identifier assigned to the program window 114a-c may be included as a parameter in the preview event. As part of detecting the preview event, the window image client 120 may obtain the program identifier and locate the window image 126 in the image cache 122 using the program identifier.

In one example, the window image client 120 may provide a window image 126 to the operating system 124 on the client device 116 by providing a location of the window image 126 in the image cache 122 to the operating system 124, allowing the operating system 124 to retrieve the window image 126 from the image cache 122. The operating system 124 may retrieve the window image 126 from the image cache 122 and store a copy of the window image 126 for use by the operating system 124 to display the window image 126 in response to preview events. For example, in response to receiving a window image 126 from the window image service 108 located in the service provider environment 102, the window image client 120 may store the window image 126 in the image cache 122, and the window image client 120 may provide the operating system 124 with a memory location where the window image 126 is stored in the image cache 122. In addition, the window image client 120 may provide the operating system 124 with a program identifier included in image metadata 144 for the window image 126. The operating system 124 may associate the memory location of the window image 126 with the program identifier, and thereafter, retrieve the window image 126 from the image cache 122 and store a copy of the window image 126. Thereafter, in response to a preview event associated with an application window 114a-c assigned the program identifier, the operating system 124 may display the window image 126 on the client device 116.

In an alternative example configuration, the operating system 124, as part of creating a taskbar button 130a-c for the program window 114a-c, may reserve or designate a location in computer memory for storing the window image 126 of the program window 114a-c. The window image client 120 may obtain the memory location from the operating system 124 and store the window image 126 in the memory location controlled by the operating system 124, which acts as the image cache 122. For example, the window image client 120 may request that the operating system 124 provide a memory location used to cache a window image 126 of a program window 114a-c that has a program identifier that corresponds to the image metadata 144 for the window image 126. Thereafter, in response to detecting the preview event associated with the taskbar button 130a-c, the operating system 124 may obtain the window image 126 from the memory location acting as the image cache 122, and the operating system 124 may display the window image 126 on the client device 116.

In another example configuration, the program streaming client 118 may have a graphical user interface (not shown) that includes one or more graphical elements (e.g., icons, buttons, etc.) that are associated with preview events that when triggered cause the program streaming client 118 to display a window image 126 for a program window 114a-c in the graphical user interface. The window image client 120 may be configured to provide a window image 126 for a program window 114a-c to the program streaming client 118 to allow the window image 126 to be displayed in a graphical user interface for the program streaming client 118. The window image client 120 may interface with the program streaming client 118 to provide window images 126 in response to detecting a preview event. The method used to provide window images 126 to the program streaming client 118 may be similar to the method described herein used to provide the operating system 124 with window images 126. For example, in response to a preview event associated with a program window 114a-c, the program streaming client 118 may send a request for a window image 126 to the window image client 120, which in response may provide the program streaming client 118 with a memory location in image cache 122 where the window image 126 is stored. Thereafter, the window image client 120 may request that the window image service 108 provide updated window images 126 for the program window 114a-c, and the window image service 108 located in the service provider environment 102 may monitor the program window 114a-c and send updated window images 126 for the program window 114a-c when the program window 114a-c is modified.

In one example, the window image client 120, as part of detecting a preview event on the client device 116, may send a request to the window image service 108 located in the service provider environment 102 asking for an updated version of a window image 126 of a program window 114a-c associated with the preview event. The window image client 120 may communicate with the program streaming client 118 that displays the remote graphical desktop 112 on the client device 116. As part of displaying the remote graphical desktop 112 on the client device 116, the program streaming client 118 may request that the operating system 124 create a taskbar button 130a-c for a program window 114a-c included in the remote graphical desktop 112. As a consequence, the operating system 124 may notify the program streaming client 118 when events associated with the taskbar button 130a-c are detected, such as when a graphical user interface pointer is positioned on the taskbar button 130a-c, or when the pointer is positioned on a taskbar preview window 132 displayed near (e.g., above) the taskbar button 130a-c. The window image client 120 may interface with the program streaming client 118 in order to receive notifications for preview events related to the taskbar button 130a-c and the program window 114a-c associated with the taskbar button 130a-c.

In response to detecting a preview event associated with a program window 114a-c, the window image client 120 may send a request to the window image service 108 located in the service provider environment 102 asking for an updated window image 126 of program window 114a-c. In response to receiving the request for the updated window image 126, the window image service 108 may obtain the updated window image 126 of the program window 114a-c and send the updated window image 126 to the window image client 120. In an alternative example, the program streaming client 118 may initiate the creation of an updated window image 126 for a program window 114a-c by sending a notification to the window image service 108 located in the service provider environment 102 that a preview event associated with the program window 114a-c has been detected on the client device 116. For example, the operating system 124 may notify the program streaming client 118 that a preview event associated with a taskbar button 130a-c associated with a program window 114a-c has been detected. In response, the program streaming client 118 may send a message to the window image service 108 indicating that the preview event has been detected on the client device 116. The window image service 108 may obtain an updated window image 126 of the program window 114*a-c* and send the updated window image 126 to the window image client 120 on the client device 116.

In response to receiving an updated window image 126, the window image client 120 may replace an older version of the window image 126 stored in the image cache 122 may be replaced (e.g., overwritten) with the updated window image 126. Replacing the older version of the window image 126 in the image cache 122 with the updated version of the window image 126 may cause a preview window 126 to be refreshed to display the updated version of the window image 126.

The window image client 120, in one example, may receive a message from the window image service 108 located in the service provider environment 102 that a program window 114*a-c* included in the remote graphical desktop 112 has been terminated. In response, the window image client 120 may remove a window image 126 of the program window 114*a-c* from the image cache 122. For example, the message sent by the window image service 108 may contain a program identifier assigned to the program window 114*a-c*, and the window image client 120 may use the program identifier to locate and remove the window image 126 associated with the program window 114*a-c* from the image cache 122.

The various processes and/or other functionality contained within the system 100 may be executed on one or more processors that are in communication with one or more memory modules. In particular, the service provider environment 102 may include a number of computing devices that are arranged, for example, in one or more server banks or computer banks or other arrangements. The computing devices may support a computing environment using hypervisors, virtual machine monitors (VMMs) and other virtualization software. The system 100 may include one or more data stores, which may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the services, client, and agents included in the system 100 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

A network 140 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 1 illustrates that certain processing services may be discussed in connection with this technology. In one example configuration, a service may be implemented using modules with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 1 illustrates an example of a system that may implement the techniques above, many other similar or different environments are possible. The example environments discussed and illustrated above are merely representative and not limiting.

FIG. 2 is a diagram that illustrates an example of displaying a preview of a window image 126 on a client device 116 in response to a taskbar button hover event associated with positioning a graphical cursor or pointer over a taskbar button 130. As described earlier in association with FIG. 1, a program window 114 may be included in a remote graphical desktop 112 streamed to the client device 116. An operating system on the client device 116 may create a taskbar button 130 for the program window 114. The taskbar button 130 may be included in a taskbar 128 in a local graphical desktop 134. As part of creating the taskbar button 130, the operating system may map the taskbar button 130 to the program window 114.

A taskbar button hover event may be triggered when a cursor or pointer 146 is placed within the boundaries of the taskbar button 130. Triggering the taskbar button hover event may cause the operating system on the client device 116 to obtain (or receive) a window image 126 of the program window 114 and display the window image 126 on the client device 116. In particular, as shown in FIG. 2, the window image 126 of the program window 114 may be included in a taskbar preview window 132 displayed in the foreground of the local graphical desktop 134, such that the taskbar preview window 132 may be in front of other windows included in the remote graphical desktop 112 and the local graphical desktop 134, allowing a customer to view a recent state of the program window 114, such as when the program window 114 is obscured by other windows in the remote graphical desktop 112 and/or the local graphical desktop 134. The taskbar preview window 132, in some contexts, may be called a thumbnail preview window. The taskbar preview window 132 may be displayed above the taskbar button 130 associated with the program window 114 and the taskbar preview window 132 may contain a thumbnail image of the window image 126 (e.g., a reduced-sized version of the window image 126).

FIGS. 3A-B are diagrams illustrating examples of displaying a preview of a window image 126 on a client device 116 in response to a thumbnail preview hover event detected on the client device 116. The thumbnail preview hover event may be triggered when a cursor or pointer 146 is placed within the boundaries of a taskbar preview window 132 containing a thumbnail image of the window image 126. Triggering the thumbnail preview hover event may cause the operating system on the client device 116 to hide other windows displayed in the local graphical desktop 134 (including a window used to display a remote graphical desktop) and display an expanded preview window 148*a-b* that contains the window image 126, such that the expanded preview window 148a-b may be the primary window displayed in the local graphical desktop 134.

Accordingly, the window image 126 contained in the taskbar preview window 132 may be displayed in the expanded preview window 148a-b on the local graphical desktop 134 (e.g., the taskbar preview window 132 and the expanded preview window 148a-b may contain representations of the same program window contained in a remote graphical desktop). In one example, the window image 126 contained in the taskbar preview window 132 may be generated, for example, from a higher resolution window image (e.g., via image downsampling), and the higher resolution window image (e.g., a pixel-by-pixel representation of a program window contained in a remote graphical desktop) may be displayed in the expanded preview window 148a-b on the local graphical desktop 134.

As illustrated in FIGS. 3A-B, an expanded preview window 148a-b may contain a window image 126 that represents a program window in a remote graphical desktop. In one example, a window state (e.g., normal as illustrated by a first program window 148a or maximized as illustrated by the second program window 148b) and window dimensions of the expanded preview window 148a-b may be set to correspond to the window state and window dimensions of the program window contained in the remote graphical desktop. The window state and window dimensions for the program window may be obtained from image metadata for the window image 126, and the window state and window dimensions may be used to size the expanded preview window 148a-b displayed in a local graphical desktop 134 on the client device 116. The window image 126 displayed in the expanded preview window 148a-b may be a pixel-by-pixel representation of the program window contained in the remote graphical desktop. For example, the window image 126 may be a copy of the program window in the remote graphical desktop, and the resolution of the window image 126 may be the same, or substantially the same, as the resolution of the program window in the remote graphical desktop.

As an illustration shown in FIG. 3A, if the window state of the program window in the remote graphical desktop is set to normal, the dimensions of the program window can be obtained from image metadata for a window image 126 that represents the program window, and the dimensions of the expanded preview window 148a containing the window image 126 may be set to the dimensions of the program window. Accordingly, the window state and window dimensions of the expanded preview window 148a displayed in the local graphical desktop 134 may correspond to the window state and window dimensions of the program window included in the remote graphical desktop.

As another illustration shown in FIG. 3B, if the window state of the program window in the remote graphical desktop is set to maximized, the window state of the expanded preview window 148b may also be set to maximized, such that the operating system on the client device 116 may set the dimensions of the expanded preview window 148b to substantially fill the space of the local graphical desktop 134 on the client device 116. As such, when the window state of the program window included in the remote graphical desktop is set to maximized, the window state of the expanded preview window 148b displayed in the local graphical desktop 134 can also be set to maximized.

Figure 4A:
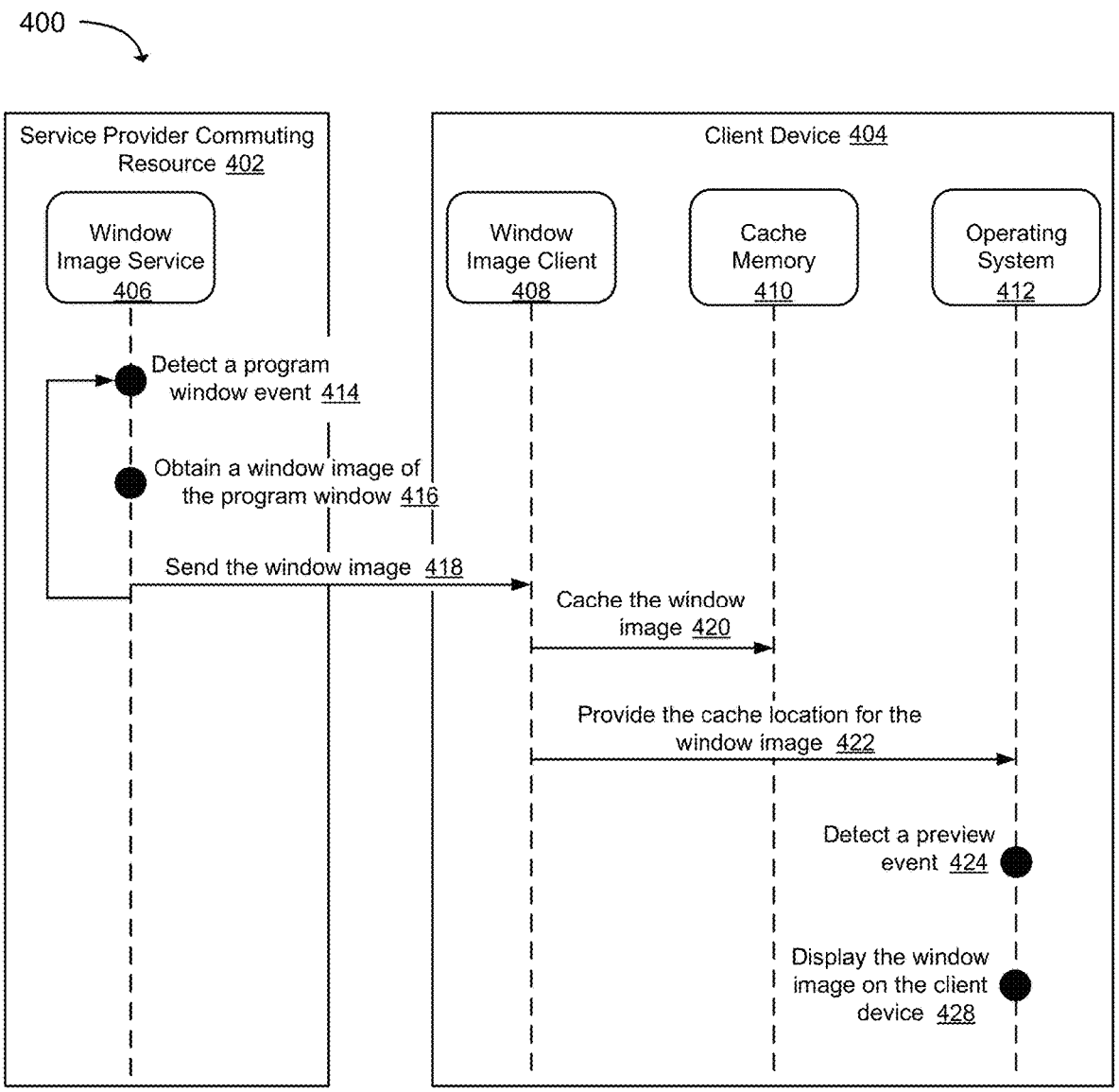
FIGS. 4A-B are sequence diagrams that illustrate an example method for providing a window image of a program window to a client device.
Figure 4B:
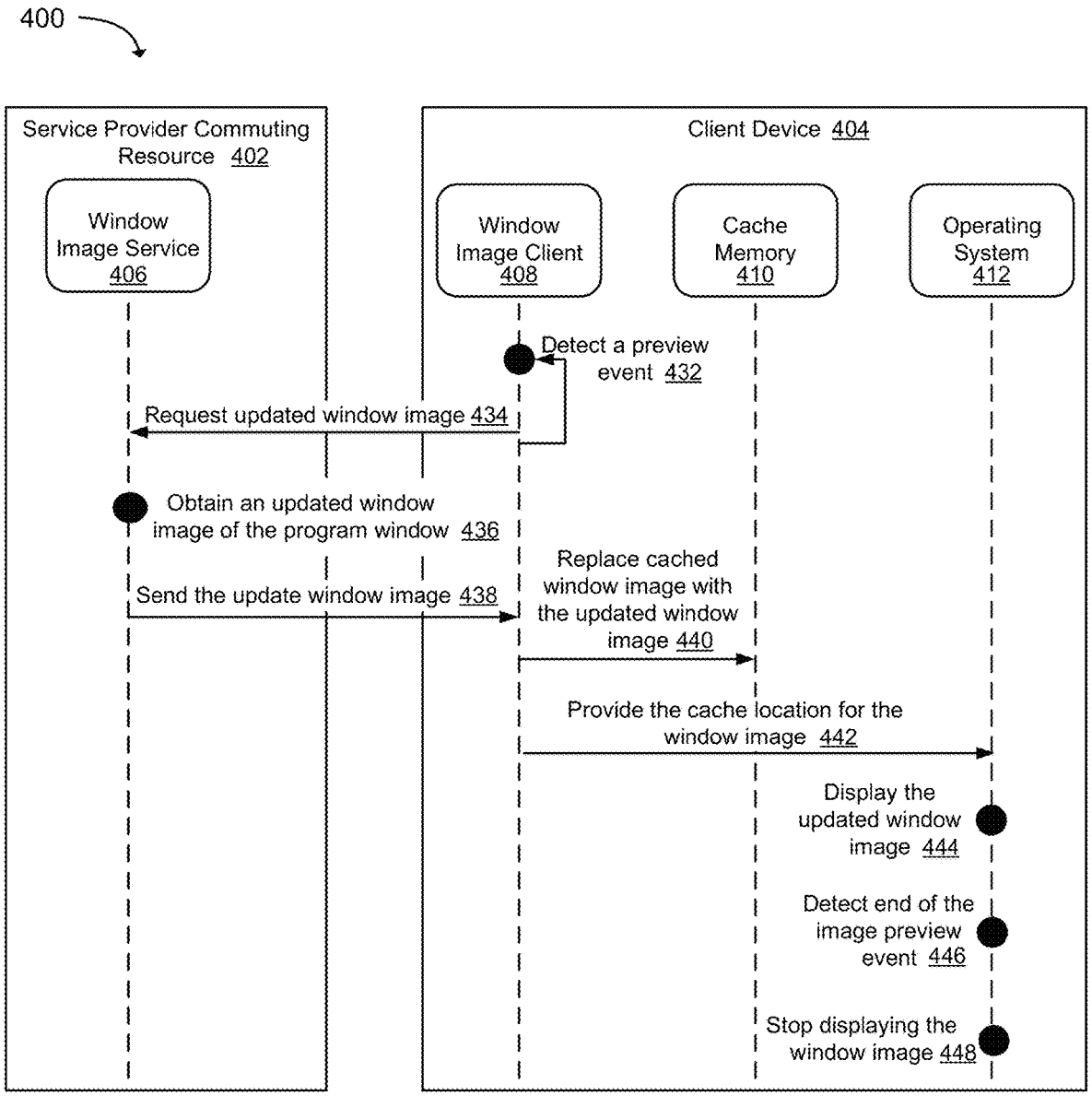

FIGS. 4A-B are sequence diagrams that illustrate an example method 400 for providing a window image of a program window to a client device 404 to allow the window image to be displayed on the client device 404 when a preview event is detected on the client device 404. As described earlier, a remote graphical desktop containing program windows for programs executed on a service provider computing resource 402 (e.g., server, computing instance, software container, etc.) may be streamed to a client device 404 to allow a customer of a service provider to utilize the programs. The present technology can be used to provide the customer with a preview of a program window included in the remote desktop when the customer triggers a preview event on the client device, such as when the customer positions a graphical user interface pointer on a taskbar button associated with the program window or performs a selection action with respect to the taskbar button (e.g., mouse right click or wheel movement), causing the operating system on the client device 404 display a window image of the program window in a preview window above the taskbar button.

In the example illustrated in FIG. 4A, the service provider computing resource 402 may host a window image service 406 that is in network communication with a window image client 408 located on the client device 404. The window image service 406 hosted on the service provider computing resource 402 may execute as a process on a computing resource and monitor a program window for a program that executes on the computing resource to detect a program window event that modifies the program window in some way. Program window events that may be detected by the window image service 406 may include, but are not limited to: window lifecycle events associated with creating and terminating a program window included in a remote graphical desktop; window state events that resize a program window (e.g., modify a window size and/or window dimensions); window content events that modify the content in a program window (e.g., inputs, deletions, modifications or 2D or 3D animations to the content displayed in the program window); window playback events associated with video playback in a program window; window active events that bring a program window to the foreground of a remote graphical desktop; as well as other types of window events.

The window image service 406, as in operation 414, may detect a program window event associated with a program window and, as in operation 416, obtain a window image of the program window. For example, the window image service 406 executing as a process may receive a message from an operating system indicating that a program window has been created, or that a change has been made to the program window. In response, the window image service 406 may request that the operating system generate a window image (e.g., an image capture or a screenshot) of the program window and provide the window image to the window image service 406.

After obtaining the window image, the window image service 406 may send the window image over a computer network to the window image client 408 located on the client device 404, as in operation 418. The window image service 406 may continue monitoring the program window to detect subsequent program window events that modify the program window, and window image service 406 may obtain and send window images that show the modifications to the program window to the window image client 408. In one example, the window image service 406 may work independently to obtain and provide window images to the window image client 408.

In response to receiving a window image, the window image client 408 may store the window image in cache memory 410 on the client device 404, as in operation 420.

After storing the window image in the cache memory 410, the window image client 408 may provide a cache location where the window image is stored in the cache memory 410 to the operating system 412, as in operation 422. Providing the cache location to the operating system 412 may allow the operating system 412 to retrieve the window image from the cache location and store a copy of the window image in a memory location reserved by the operating system 412.

As in operation 424, the operating system 412 may detect a preview event associated with the program window. As an illustration, the preview event may include a hover event that causes the window image of the program window to be displayed in a thumbnail preview above the taskbar button on the client device 404, or the preview event may include a thumbnail preview hover event that causes the window image of the program window to be displayed in the forefront of a desktop environment on the client device 404. As in operation 428, the operating system 426 may display the window image in a preview window in a local graphical desktop of the client device 404.

In the example illustrated in FIG. 4B, the window image client 408 may be configured to monitor the client device 404 for preview events that cause the operating system 412 to display a preview of the program window on the client device 404. For example, the window image client 408 may execute as a process on the client device 404, and the window image client 408 may be notified of events related to a taskbar button associated with the program window, such as when a graphical user interface pointer is positioned on the taskbar button, or when the pointer is positioned on a thumbnail preview displayed near (e.g., above) the taskbar button.

As in operation 432, the window image client 408 may detect a preview event. The preview event may include a hover event that causes the window image of the program window to be displayed in a thumbnail preview above a taskbar button, or a thumbnail preview hover event that causes the window image of the program window to be displayed in the forefront of a desktop environment on the client device 404, or another preview event that displays a preview of the program window on the client device 404.

In response to detecting the preview event, the window image client 408 may send a request for an updated window image to the window image service 406 located on the service provider computing resource 402, as in operation 434. The window image service 406 may receive the request for the updated window image and, as in operation 436, obtain an updated window image of the program window as requested by the window image client 408. As in operation 438, the window image service 406 may send the updated window image to the window image client 408 on the client device 404. In one example, receiving the request for the updated window image from the window image client 408 may initiate monitoring of the corresponding program window in the remote graphical desktop by the window image service 406.

In one example, prior to sending the updated window image to the window image client 408 on the client device 404, the window image service 406 may first determine whether the program window associated with the request has been modified, or has been sufficiently modified, since sending a first window image to the window image client 408. In one example, as described earlier in association with FIG. 1, a modification threshold may be used to determine whether a program window has been sufficiently modified to send an updated window image to the window image client 408 on the client device 404. As an example, in a case where the program window has not been modified, or has only been slightly modified (e.g., a single change to window content), then the window image service 406 may ignore the request for the updated window image or send an exception notification to the windows image client 408 and continue monitoring the program window for changes that meet a modification threshold that permits the window image service to send an updated window image to the window image client 408. When the modification threshold is met, then the updated window image may be sent.

The window image client 408 may receive an updated window image from the window image service 406, and as in operation 440, the window image client 408 may store the updated window image in the cache memory 410 to replace (e.g., overwrite) the previous window image stored in the cache memory 410. In one example, the updated window image may be stored to a same location in cache memory 410 where the previous window image was stored to allow the operating system 412 to obtain the updated window image from the same location in cache memory 410 were the previous window image was stored.

Accordingly, as in operation 442, after storing the updated window image in the cache memory 410, the window image client 408 may provide the cache location to the operating system 412. Providing the cache location to the operating system 412 may allow the operating system 412 to retrieve the updated window image from the cache location and store a copy of the updated window image in a memory location reserved by the operating system 412. As in operation 444, the operating system 412 may display the updated window image on the client device 404. In one example, the operating system 412 may update a preview window used to display a window image with the updated window image. For example, the operating system 412 may replace the previous window image displayed in the preview window with the updated window image to provide a current state, or a more recent state, of the program window represented by the window image.

During a duration of a preview event (e.g., a time during which a graphical user interface pointer is positioned within the bounds of a taskbar button), the window image client 408 may make periodic requests for updated window images to the window image service 406. The requests may be asynchronous requests, such that the window image service 406 may respond with an updated window image when the updated window image is available (e.g., when a modification to a corresponding program window has been detected allowing for the updated window image to be generated). In one example, the window image client 408 may work independently to detect preview events on the client device 404 and obtain window images of program windows associated with the preview events and provide the window images to the operating system 412 on the client device 404.

As in operation 446, the operating system 412 may detect an end to the preview event (e.g., detect that a graphical user interface pointer is no longer positioned on a taskbar button), and as in operation 448, the operating system 412 may stop displaying the window image of the program window on the client device 404 (e.g., terminate a preview window used to display the window image).

Figure 5:
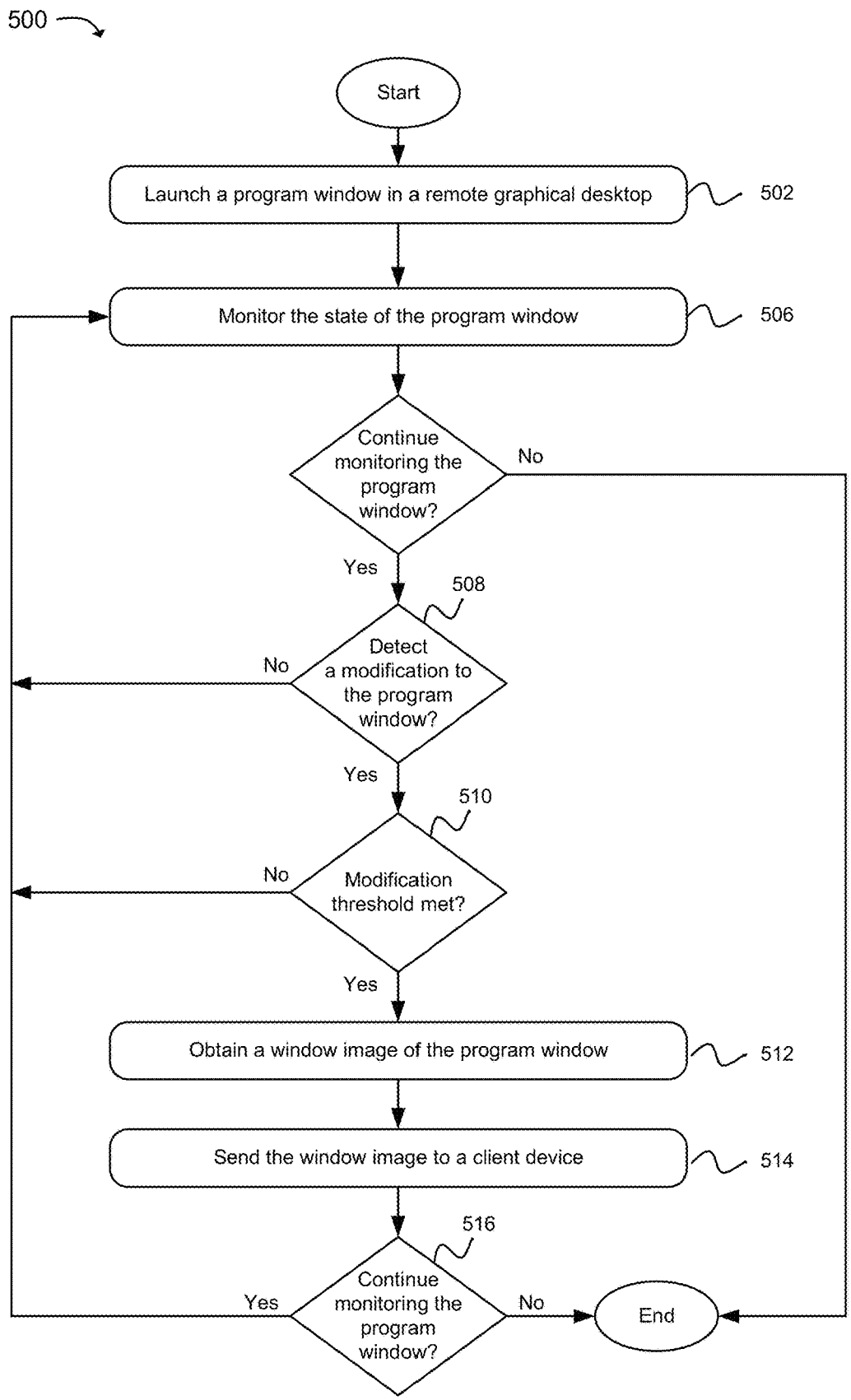
FIG. 5 is a flow diagram that illustrates an example method for using a modification threshold to determine when to generate a window image of a program window.

Moving now to FIG. 5, a flow diagram illustrates an example process or method 500 for generating a window image of a program window included in a remote graphical desktop when a modification threshold is met. The modification threshold may be used to determine whether a program window has been sufficiently modified to trigger sending a window image of the program window to a client device using network resources that may be used to stream a remote graphical desktop to the client device.

Beginning in block 502, a program window may be launched in a remote graphical desktop hosted on a computing resource located in a computing service environment. The program window may provide a graphical user interface for a program or application that executes on the computing resource. As in block 506, the program window may be monitored to detect modifications or changes made to the program window, such as a change to a window state and window dimensions of the program window, or changes to content displayed within the program window.

As in block 508, in the event that a modification to the program window is detected, then as in block 510, a determination may be made whether the modification meets a modification threshold. In one example, the modification threshold may be a percentage change to the program window, which may include changes to the content of the program window and/or the dimensions of the program window. As one example, the modification threshold may be met when more than 2%, 5%, or 10% of the content of the program window has been changed. As another example, the modification threshold may be met when the dimensions of the program window have been changed more than 5%, 10%, or 15%. In another example, the modification threshold may be a total number of modifications made to the program window and/or the content displayed in the program window as represented by a modification counter. For example, if the modification counter indicates that the number of modifications to the program window is greater than 2, 5, 10, or more modifications, then the modification threshold may be met. As a specific example, a number of modifications made to an electronic document (e.g., a word processing document, a spreadsheet document, etc.) or modifications made to input fields of a user interface may be tracked using the modification counter, and if the number of modifications is greater than 2, 5, 10, or more modifications, then the modification threshold may be met. As will be appreciated, the modification thresholds described above are merely illustrative. Other types of modification thresholds not specifically described herein are within the scope of this disclosure In the case that the modification threshold is not met, monitoring of the program window may continue until the modification threshold is met. In the case that the modification threshold is met, then as in block 512, a window image of the program window showing the modifications made to the program window may be obtained, and the window image may be sent to the client device, as in block 514. After sending the window image to the client device, the process or method 500 may be used to continue monitoring of the program window. As in block 516, in the case that monitoring of the program window is to continue (e.g., the program window is active), then the process or method 500 may continue tracking modifications made to the program window. In the case that the program window is no longer active or has been terminated, then monitoring of the program window may be discontinued.

Figure 6:
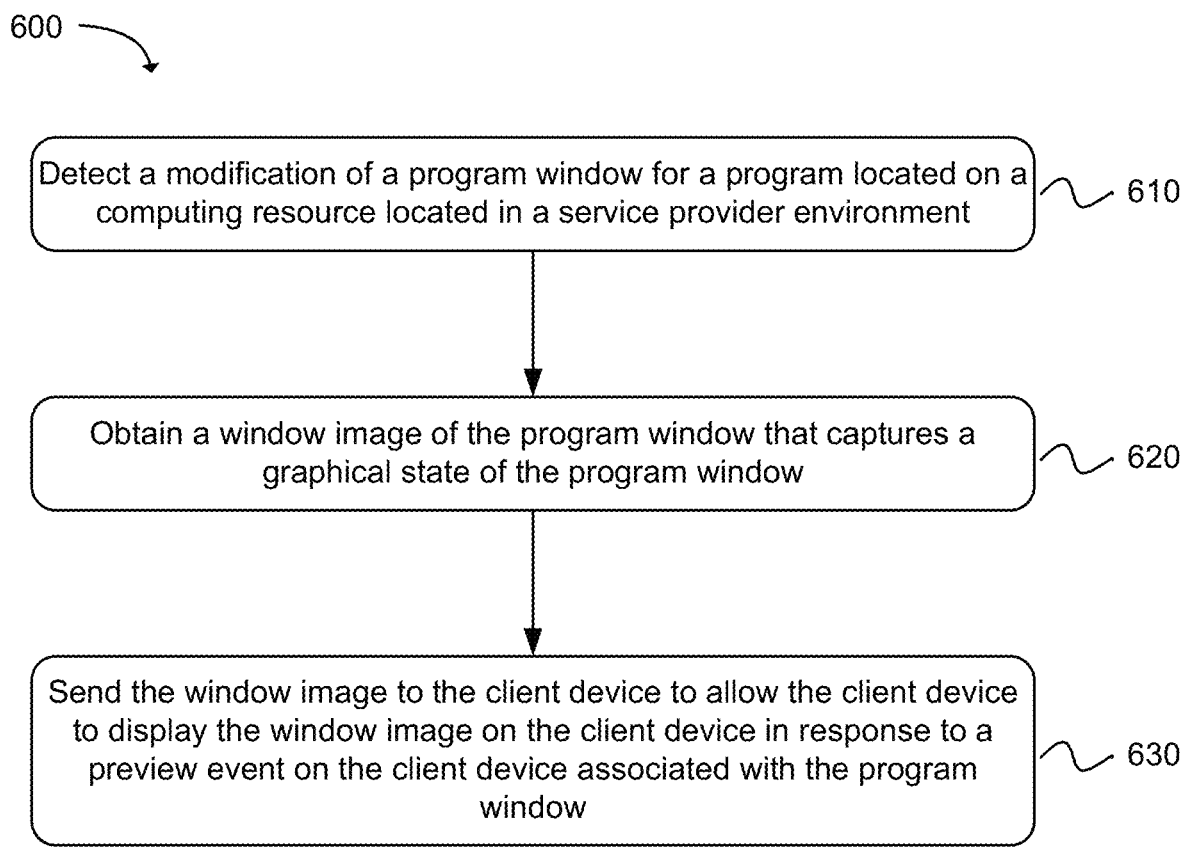
FIG. 6 is a flow diagram illustrating an example method for providing a window image of a program window located in a remote graphical desktop hosted in a service provider environment.

FIG. 6 is a flow diagram that illustrates an example method 600 for providing a window image of a program window located in a remote graphical desktop hosted in a service provider environment. As in block 610, a modification of a program window located on a computing resource located in a service provider environment may be detected. The program window may be associated with a program hosted on the computing resource (e.g., the program window may contain a user interface for the program), and the program window may be streamed to a client device to allow the program window to be displayed on the client device, enabling a user to interact with the program window. The modification to the program window may be a launch of the program window on the computing resource, a modification to the window state and/or dimensions of the program window, and/or a modification to content contained within the program window.

After launching the program window on the computing resource, a window image service located on the computing resource may obtain a window image of the program window capturing a graphical state of the program window, as in block 620. The window image service may send the window image to a program streaming client on the client device to allow the client device to display the window image on the client device in response to a preview event on the client device that is associated with the program window, as in block 630. In one example, the window image of the program window may be obtained and sent to the client device immediately after launching the program window. As such, the window image may be available on the client device prior to the occurrence of a preview event associated with the program window on the client device.

In one example, after sending a first version of a window image of the program window to the client device, the window image service may monitor the program window located in the service provider environment to detect a program window event that modifies the program window. In response to detecting a program window event that modifies the program window, the window image service may obtain and send an updated version of the window image to the client device. For example, the window image service may detect a change to content contained in the program window, detect video playback in the program window, detect a window resize event that resizes the program window, or other program window changes and modifications. In one example, prior to sending an updated window image, the window image service may first determine that modifications to the program window meet a modification threshold.

In another example, after sending the first version of the window image of the program window to the client device, the window image service may receive a request from the client device requesting an updated version of the window image. The client device may send the request in response to detecting a preview event on the client device that causes the window image to be displayed on the client device. In response to the request, the window image service may obtain and send an updated version of the window image to the client device. In one configuration, prior to sending the updated version of the window image to the client device, the window image service may determine whether the program window located in the service provider environment has been modified. In the case that the program window has been modified, the window image service may send the updated version of the window image to the client device. In a further configuration, prior to sending the updated window image, the window image service may first determine that modifications made to the program window meet a modification threshold.

Figure 7:
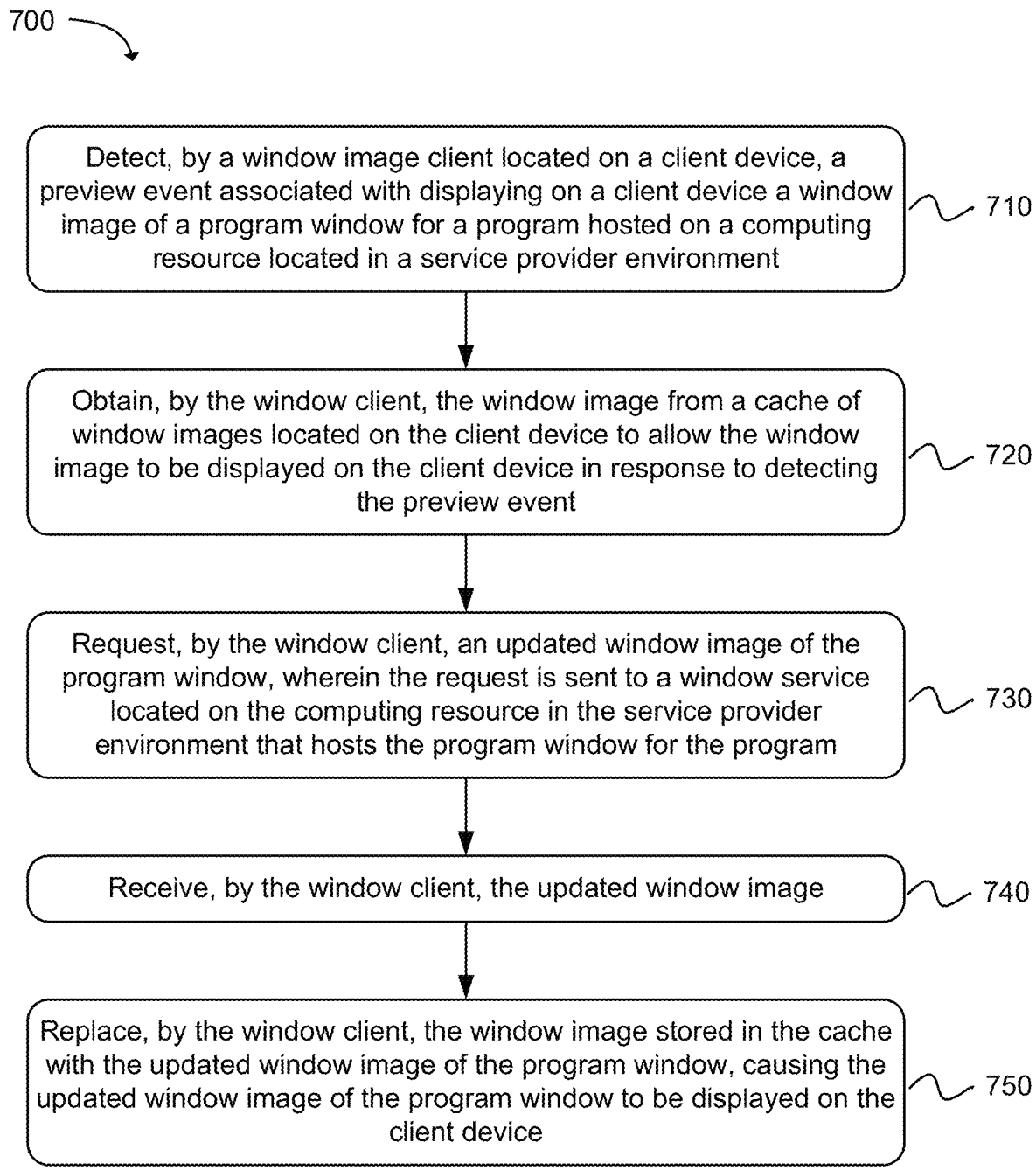
FIG. 7 is a flow diagram illustrating an example method for obtaining a window image of a program window in response to detecting a preview event on a client device.

FIG. 7 is a flow diagram illustrating an example method 700 for obtaining a window image of a program window in response to detecting a preview event on a client device. As in block 710, a window image client located on a client device may detect a preview event associated with displaying on a client device a window image of a program window for a program hosted on a computing resource located in a service provider environment. In one example, the preview event detected on the client device includes a hover event that causes the window image of the program window to be displayed in a thumbnail preview above a taskbar button associated with the program window on the client device. In another example, the preview event detected on the client device includes a thumbnail preview hover event that causes the window image of the program window to be displayed in the forefront of a desktop environment on the client device.

In response to detecting the preview event, the window image client may obtain the window image from a cache of window images located on the client device and provide the window image to an operating system on the client device to allow the window image to be displayed on the client device in response to detecting the preview event, as in block 720. In one example, the window image may be displayed as a thumbnail preview on the client device in response to the preview event.

After providing the window image to the operating system on the client device, the window image client may request an updated window image of the program window, as in block 730. The request may be sent to a window image service located on the computing resource in the service provider environment that hosts the program window for the program. In one example, the window image client on the client device may periodically send requests for updated window images to the window image service located in the service provider environment, and in response to receiving the requests, the window image service may determine whether the program window has been modified, and if the program window has been modified, the window image service may send the updated window image to the window image client.

As in block 740, the window image client may receive the updated window image from the window image service in the service provider environment, and as in block 750, the window image client may replace the window image stored in the cache with the updated window image of the program window and cause the updated window image of the program window to be displayed on the client device. In one example, in response to receiving an indication from the window image service that the program associated with the program window in the service provider environment has been terminated, the window image client may identify a window image located in the cache of window images on the client device and remove the window image from the cache of window images.

Figure 8:
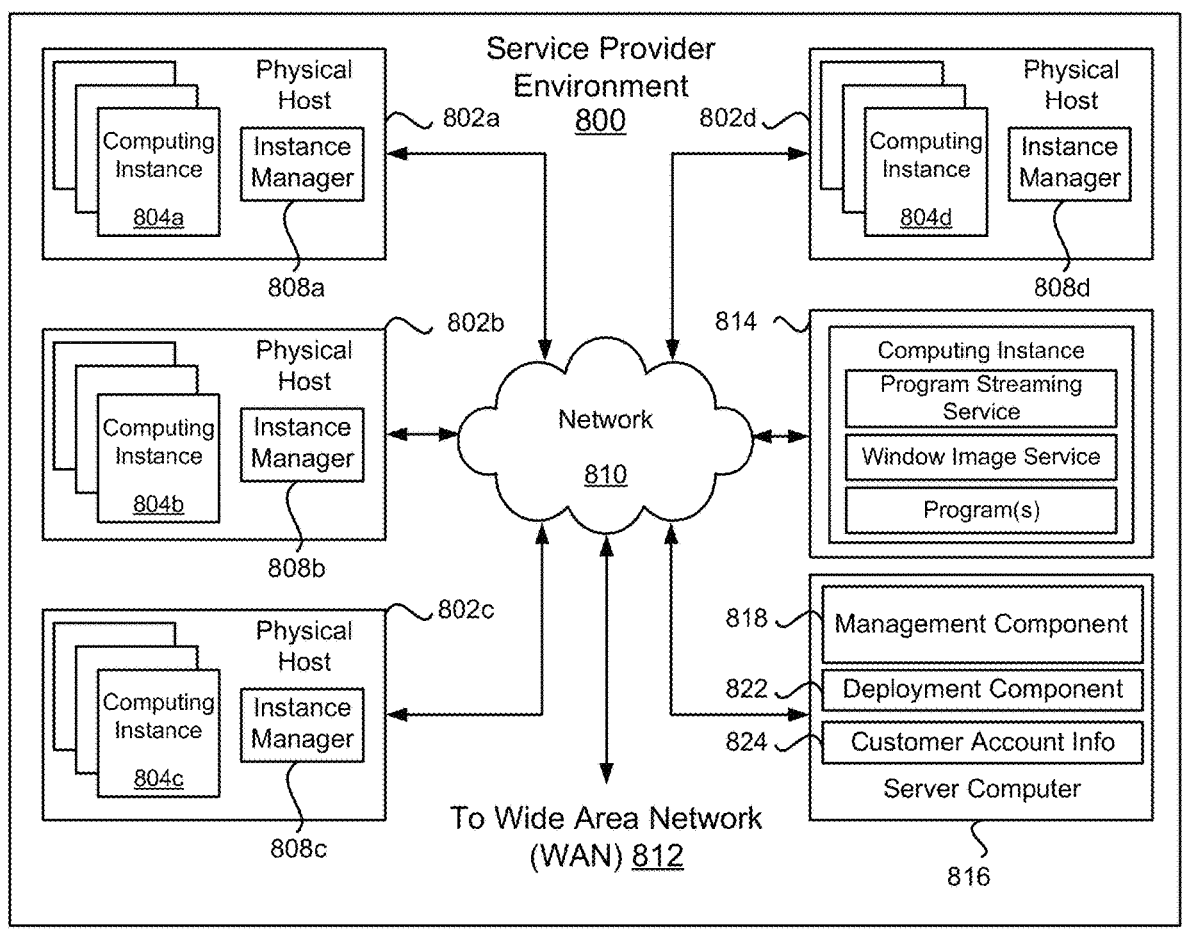
FIG. 8 is a block diagram that illustrates an example service provider environment in accordance with one aspect of the technology.

FIG. 8 is a block diagram illustrating an example computing service 800 that may be used to execute and manage a number of computing instances 804*a-d*. In particular, the computing service 800 depicted illustrates one environment that can be used to execute a remote graphical desktop and stream the remote graphical desktop to a client device, as described earlier. The computing service 800 may be one type of environment that includes various virtualized service resources that may be used, for example, to host computing instances 804*a-d* and other types of virtualized computing resources (e.g., software containers).

The service provider environment 800 may be capable of delivery of computing, storage and networking capacity as a software service. In one example, the service provider environment 800 may be established for an organization by or on behalf of the organization. That is, the service provider environment 800 may offer a "private cloud environment." In another example, the service provider environment 800 may support a multi-tenant environment, wherein a plurality of customers may operate independently (i.e., a public cloud environment). Generally speaking, the service provider environment 800 may provide the following models: Infrastructure as a Service ("IaaS"), network-accessible system as a service, and/or Software as a Service ("SaaS"). Other models may be provided. For the IaaS model, the service provider environment 800 may offer computers as physical or virtual machines and other resources. The virtual machines may be run as guests by a hypervisor, as described further below. The network-accessible system as a service model delivers a computing system that may include an operating system, programming language execution environment, database, and web server.

Application developers may develop and run software solutions in the service provider environment 800 without incurring the cost of buying and managing the underlying hardware and software. The SaaS model allows installation and operation of application software in the service provider environment 800. End customers may access the service provider environment 800 using networked client devices, such as desktop computers, laptops, tablets, smartphones, etc. running web browsers or other lightweight client applications, for example. Those familiar with the art will recognize that the service provider environment 800 may be described as a "cloud" environment.

The particularly illustrated computing service 800 may include a plurality of server computers 802*a-d*. While four server computers are shown, any number may be used, and large data centers may include thousands of server computers. The computing service 800 may provide computing resources for executing computing instances 804*a-d*. Computing instances 804*a-d* may, for example, be virtual machines. A virtual machine may be an instance of a software implementation of a machine (i.e. a computer) that executes applications like a physical machine. In the example of a virtual machine, each of the server computers 802*a-d* may be configured to execute an instance manager 808*a-d* capable of executing the instances. The instance manager 808*a-d* may be a hypervisor, virtual machine monitor (VMM), or another type of program configured to enable the execution of multiple computing instances 804*a-d* on a single server. Additionally, each of the computing instances 804*a-d* may be configured to execute one or more applications.

As illustrated, one or more servers 814 may be used to host a program streaming service, a window image service, and programs. The program streaming service and window image service may be configured as described earlier in association with FIG. 1. One or more server computers 816 may be reserved to execute software components for managing the operation of the computing service 800 and the computing instances 804*a-d*. For example, a server computer 814 may execute a computing instance placement manager that may perform functions, such as querying the server computers 802*a-d* for available computing slots and computing group state information, as well as determining a placement of a computing instance 804*a-d* in an available computing slot.

A server computer 816 may execute a management component 818. A customer may access the management component 818 to configure various aspects of the operation of the computing instances 804*a-d* purchased by a customer. For example, the customer may setup computing instances 804*a-d* and make changes to the configuration of the computing instances 804*a-d*.

A deployment component 822 may be used to assist customers in the deployment of computing instances 804*a*-

*d*. The deployment component 822 may have access to account information associated with the computing instances 804*a-d*, such as the name of an owner of the account, credit card information, country of the owner, etc. The deployment component 822 may receive a configuration from a customer that includes data describing how computing instances 804*a-d* may be configured. For example, the configuration may include an operating system, provide one or more applications to be installed in computing instances 804*a-d*, provide scripts and/or other types of code to be executed for configuring computing instances 804*a-d*, provide cache logic specifying how an application cache should be prepared, and other types of information. The deployment component 822 may utilize the customer-provided configuration and cache logic to configure, prime, and launch computing instances 804*a-d*. The configuration, cache logic, and other information may be specified by a customer accessing the management component 818 or by providing this information directly to the deployment component 822.

Customer account information 824 may include any desired information associated with a customer of the multi-tenant environment. For example, the customer account information may include a unique identifier for a customer, a customer address, billing information, licensing information, customization parameters for launching instances, scheduling information, etc. As described above, the customer account information 824 may also include security information used in encryption of asynchronous responses to API requests. By "asynchronous" it is meant that the API response may be made at any time after the initial request and with a different network connection.

A network 810 may be utilized to interconnect the computing service 800 and the server computers 802*a-d*, 816. The network 810 may be a local area network (LAN) and may be connected to a Wide Area Network (WAN) 812 or the Internet, so that end customers may access the computing service 800. The network topology illustrated in FIG. 8 has been simplified, many more networks and networking devices may be utilized to interconnect the various computing systems disclosed herein.

Figure 9:
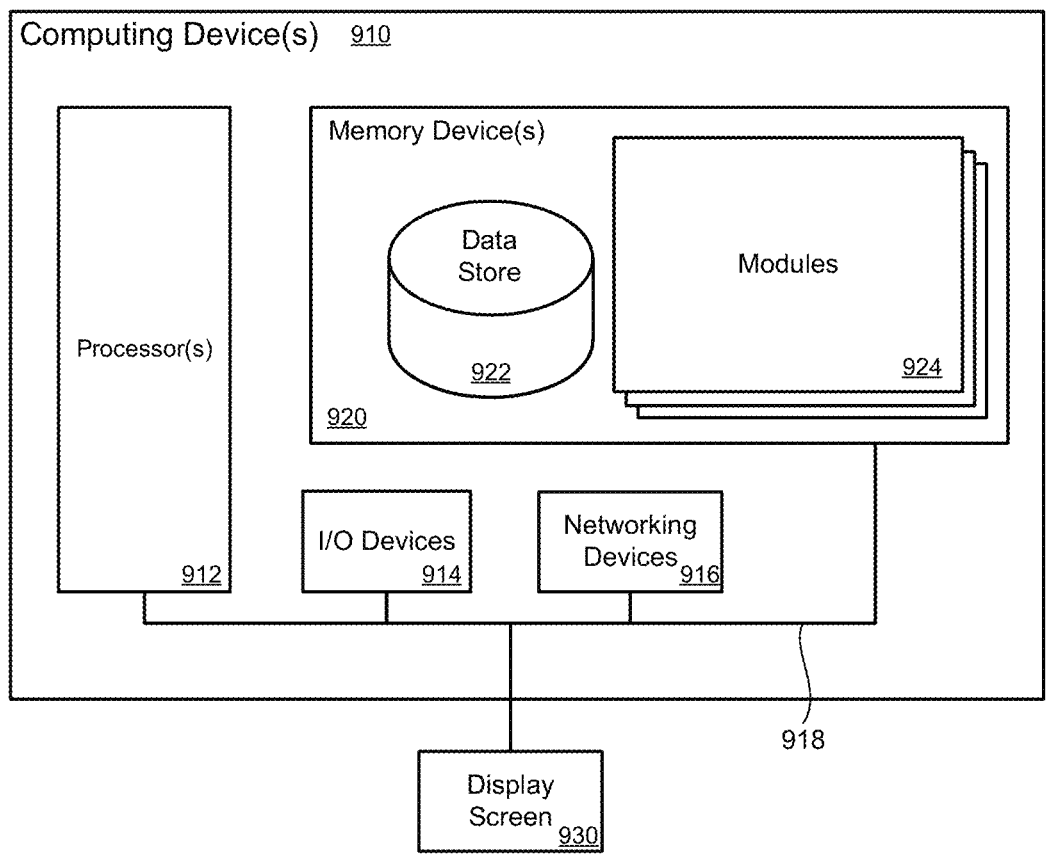
FIG. 9 is block diagram illustrating an example of a computing device that may be used to execute a method for generating a window image of a program window located in a service provider environment and providing the window image to a client device.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules 924 that are executable by the processor(s) 912 and data for the modules 924. In one example, the memory device 920 may include a program streaming service module, a program streaming client module, a window image service module, a window image client module, and other modules. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high-level programming languages that are compiled, interpreted or executed using a hybrid of the methods.

The computing device may also have access to I/O (input/output) devices 914 that are usable by the computing devices. One example of an I/O device is a display screen 930 that is accessible to the computing device 910. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory device 920 may represent multiple memory units that operate in parallel to the processing circuits. This may provide parallel processing channels for the processes and data in the system. The local communication interface 918 may be used as a network to facilitate communication between any of the multiple processors and multiple memories. The local communication interface 918 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for providing a window image of a program window located on a remote graphical desktop in a service provider environment, comprising:
   at least one processor; and
   a memory device including instructions that, when executed by the at least one processor, cause the system to:
   monitor, by a window image service, the program window associated with a program that executes on a computing resource in the service provider environment, wherein a program streaming service streams the remote graphical desktop to a client device to allow the remote graphical desktop to be displayed on the client device and to enable user interaction with the program window;
   detect, by the window image service, a program window event that modifies the program window associated with the program, wherein the program window event that modifies the program window is based at least in part on a modification threshold;
   obtain, by the window image service, the window image of the program window, wherein the window image shows a graphical state of the program window, wherein obtaining the window image includes generating the window image based at least in part on the modification threshold defining a modification of the program window and one or more time intervals between modifications;
   determine, by the window image service, the one or more time intervals based at least in part on a state of a computer network used to stream the program window to the client device; and
   send, by the window image service, the window image to a window image client on the client device to allow the window image client to store the window image and enable display on the client device in response to a preview event that is related to the program window, wherein sending the window image is based at least in part on determining that the computer network includes sufficient network bandwidth to send the window image without degrading streaming performance of the program window to the client device during the one or more time intervals.

2. The system as in claim 1, wherein the window image client stores the window image in a cache located in computer memory on the client device to make the window image available for display on the client device when the preview event occurs.

3. The system as in claim 2, wherein the window image client identifies a storage location of the window image stored in the cache and sends the storage location to an operating system on the client device to allow the operating system to display the window image on the client device.

4. The system as in claim 2, wherein the instructions that, when executed by the at least one processor, further cause the system to:
   receive a request from the window image client for an updated window image of the program window, wherein the window image client sends the request in response to the preview event;

obtain the updated window image of the program window; and send the updated window image to the window image client on the client device, wherein the window image client replaces the window image stored in the cache with the updated window image and enables the window image displayed on the client device to be replaced with the updated window image.

5. The system as in claim 1, wherein detecting the program window event further comprises:

determine, by the window image service, that the modification to the program window meets the modification threshold, wherein the modification threshold includes a percentage change to the program window; and obtain, by a window image service, the window image of the program window showing the modification to the program window when the modification meets the modification threshold.

6. A computer implemented method, comprising:

detecting a program window event that includes a modification of a program window of a program hosted on a computing resource located in a service provider environment, wherein detecting the program window event that includes the modification is based at least in part on a modification threshold, wherein the modification threshold is based at least in part on the modification of the program window and one or more time intervals between modifications, wherein the program window is streamed to a client device to allow the program window to be displayed on the client device and to enable user interaction with the program window;

obtaining a window image of the program window that captures a graphical state of the program window;

determining the one or more time intervals based at least in part on a state of a computer network used to stream the program window to the client device; and sending, to the client device, the window image to allow the client device to display the window image on the client device in response to a preview event on the client device that is associated with the program window, wherein sending the window image is based at least in part on determining that the computer network includes sufficient network bandwidth to send the window image without degrading streaming performance of the program window to the client device during the one or more time intervals.

7. The method as in claim 6, further comprising:

obtaining an updated window image of the program window that captures the modification to the program window; and sending the updated window image to the client device.

8. The method as in claim 6, further comprising:

generating window image metadata that includes a program identifier for the program located on the computing resource in the service provider environment; and sending the window image metadata to the client device to associate the window image with the program window and enable display of the window image on the client device in response to the preview event associated with the program window.

9. The method as in claim 6, further comprising:

storing, by the client device, the window image to a cache of window images; and providing, by the client device, the window image from the cache to allow the window image to be displayed in a preview window on the client device in response to the preview event on the client device that is associated with the program window.

10. The method as in claim 6, further comprising:

receiving, from the client device, a request for an updated window image of the program window;

determining that the program window on the computing resource located in the service provider environment has been modified;

obtaining the updated window image of the program window; and sending the updated window image to the client device.

11. The method as in claim 6, wherein detecting the program window event further comprises:

detecting a change to content contained in the program window; and generating the window image to capture the change to the content in the program window.

12. The method as in claim 6, wherein detecting the program window event further comprises:

detecting video playback in the program window; and generating, at the one or more time intervals, window images to capture the video playback in the program window, wherein the one or more time intervals are based at least in part on the state of the computer network used to stream the program window to the client device.

13. The method as in claim 6, wherein detecting the program window event further comprises:

detecting a window resize event that resizes the program window; and generating the window image to correspond to window dimensions of the program window.

14. The method as in claim 6, wherein detecting the program window event further comprises:

determining whether the modification to the program window meets the modification threshold, wherein the modification threshold includes a percentage change to the program window; and obtaining the window image of the program window showing the modification to the program window when the modification meets the modification threshold.

15. The method as in claim 6, wherein the preview event detected on the client device includes a hover event that causes the window image of the program window to be displayed in a thumbnail preview above a taskbar button associated with the program window on the client device.

16. The method as in claim 6, wherein the preview event detected on the client device includes a thumbnail preview hover event of a taskbar of a desktop environment that causes the window image of the program window to be displayed in a forefront of the desktop environment on the client device, wherein the desktop environment is operating remotely from the client device, and the program window is executing within the desktop environment.

17. A non-transitory machine readable storage medium including instructions embodied thereon, wherein the instructions, when executed by at least one processor, cause the at least one processor to:

detect, by a window image client located on a client device, a preview event associated with displaying a window image of a program window on the client device for a program hosted on a computing resource located in a service provider environment, wherein processing of the preview event is based at least in part on a modification threshold;

obtain, by the window image client, the window image from a cache of window images located on the client device to allow the window image to be displayed on the client device in response to detecting the preview event;

request, by the window image client, an updated window image of the program window, wherein the request is sent to a window image service located on the computing resource in the service provider environment that hosts the program window for the program;

receive, by the window image client, the updated window image, wherein the updated window image is based at least in part on the modification threshold defining a modification of the program window and one or more time intervals between modifications, wherein the one or more time intervals are based at least in part on a state of a computer network used to stream the program window to the client device, and wherein receiving the updated window image is based at least in part on determining that the computer network includes sufficient network bandwidth to receive the updated window image without degrading streaming performance of the program window to the client device during the one or more time intervals; and replace, by the window image client, the window image stored in the cache with the updated window image of the program window to enable the updated window image of the program window to be displayed on the client device.

18. The non-transitory machine readable storage medium as in claim 17, wherein the window image client provides window images to an operating system for the client device which causes the window images to be displayed as thumbnail previews on the client device in response to preview events.

19. The non-transitory machine readable storage medium as in claim 17, wherein the instructions, that when executed by the at least one processor, further cause the at least one processor to:

send periodically, by the window image client, requests for updated window images to the window image service located on the computing resource in the service provider environment that hosts the program window for the program, wherein, in response to the requests, the window image service determines whether the program window has been modified, and the window image service sends the updated window image to the window image client when the program window has been modified.

20. The non-transitory machine readable storage medium as in claim 17, wherein the instructions, that when executed by the at least one processor, further cause the at least one processor to:

receive, from the window image service, an indication that the program has been terminated on the computing resource located in the service provider environment;

identify the window image located in the cache of window images on the client device; and remove, based at least in part on receiving the indication that the program has been terminated from the window image service, the window image from the cache of window images.

* * * * *